US012036717B2

(12) United States Patent
Hackfort et al.

(10) Patent No.: US 12,036,717 B2
(45) Date of Patent: Jul. 16, 2024

(54) NIP ROLLER ADJUSTMENT

(71) Applicant: MATTHEWS INTERNATIONAL CORPORATION, Pittsburgh, PA (US)

(72) Inventors: Thomas Hackfort, Ahaus (DE); Harald Bartsch, Dorsten-Rhade (DE); Hermann Bernhard Wilmer, Vreden (DE)

(73) Assignee: Matthews International Corporation, Pittsburgh, PA (US)

( * ) Notice: Subject to any disclaimer, the term of this patent is extended or adjusted under 35 U.S.C. 154(b) by 0 days.

(21) Appl. No.: 17/980,933

(22) Filed: Nov. 4, 2022

(65) Prior Publication Data

US 2023/0166441 A1    Jun. 1, 2023

Related U.S. Application Data

(60) Provisional application No. 63/275,857, filed on Nov. 4, 2021.

(51) Int. Cl.
| | |
|---|---|
| *B29C 48/35* | (2019.01) |
| *B29C 48/00* | (2019.01) |
| *B29C 48/08* | (2019.01) |
| *B29C 48/92* | (2019.01) |
| *B29L 7/00* | (2006.01) |

(52) U.S. Cl.
CPC .......... *B29C 48/35* (2019.02); *B29C 48/0011* (2019.02); *B29C 48/08* (2019.02); *B29C 48/92* (2019.02); *B29C 2948/92076* (2019.02); *B29L 2007/008* (2013.01)

(58) Field of Classification Search
None
See application file for complete search history.

(56) References Cited

U.S. PATENT DOCUMENTS

| | | | |
|---|---|---|---|
| 4,363,862 A | 12/1982 | Thiebault | |
| 6,651,557 B1 | 11/2003 | Costin et al. | |
| 8,548,345 B2 | 10/2013 | Minbe et al. | |
| 2008/0006511 A1 | 1/2008 | Jackson et al. | |
| 2010/0263559 A1* | 10/2010 | Novak | B41F 13/20 248/222.13 |

FOREIGN PATENT DOCUMENTS

| | | | | |
|---|---|---|---|---|
| EP | 2017078 A2 | 1/2009 | | |
| KR | 20070033905 A | * | 3/2007 | B29C 43/24 |

OTHER PUBLICATIONS

Machine Translation KR_20070033905_A_I (Year: 2007).*

* cited by examiner

*Primary Examiner* — Robert J Grun

(57) ABSTRACT

Disclosed are apparatuses and methods for forming films having uniform thicknesses across the entire width of the film. The films are also disclosed. The apparatus for forming the film includes a first nip roller and a second nip roller, each of the first nip roller and the second nip roller being configured to compress the powder as it passes between the first nip roller and the second nip roller and thereby form the film, whereby in the absence of a force counteracting the pressure of the passage of the powder between the first nip roller and the second nip roller the first nip roller is deflected to a greater degree than the second nip roller. Furthermore, the first nip roller and the second nip roller are each associated with one or more eccentric bearings that rotate to apply force vectors to the first nip roller and the second nip roller.

13 Claims, 8 Drawing Sheets

NIP ROLLER ADJUSTMENT

CROSS REFERENCE TO RELATED APPLICATIONS

This application claims priority to U.S. Provisional Application Ser. No. 63/275,857 filed on Nov. 4, 2021, the entirety of which is incorporated by reference herein.

FIELD

The present disclosure relates to an integrated roller bending device. More specifically, the present disclosure relates to a device capable of counteracting deflection in any angle orthogonal to the center axis of the device to ensure the generation of a film with uniform thickness.

The precise formation of films, which are alternatively referred to in the art as sheets, webs, or substrates, is an industry challenge. Precise formation of films is especially difficult where the physical space available for the film formation equipment is limited, where the film formation equipment is itself responsible for the initial intake of the constituent materials that form the film, where high pressures must be applied to the constituent materials during film formation, or where more than one of the above requirements are present. In each of such situations, persons of skill are generally required to select nip rollers having reduced diameters. Therefore, when these and other design requirements are present, deflection of one or more nip rollers causes the resultant film to have an excessively convex, excessively concave, or otherwise undesired profile. To maintain the desired, completely flat film profile, deflection of each of the one or more nip rollers must be independently controlled within the design constraints of the overall roller apparatus.

The exact thickness of film profile is also critical, especially in the field of manufacturing electrochemical cells such as Li-ion cells. The thickness of the film must be uniform over its entire length. This is because during production of Li-ion cells such as cylindrical, prismatic, or pouch cells, the electrode films are fabricated and laminated to other layers such as the separator and current collectors before the entire endless laminated film is cut to a predetermined length. The cut laminated film is wound to form a Li-ion cell. Any deviation in the thickness of the film over its length changes the size of the wound layers of film that result from the above process, potentially resulting in a defective wound body that cannot be used to form a cylindrical, prismatic, or pouch cell. For all of the above reasons, there is a need for improved systems, methods, and apparatus to ensure accuracy of the thickness of the films.

SUMMARY

There is provided a roller apparatus including one or more nip rollers that retains the alignment in any angle orthogonal to the center axis of the nip rollers through the use of eccentric bearings which are capable of rotating independently of each other to counteract the deflection of the nip rollers.

In some aspects, the techniques described herein relate to an apparatus for forming a film having a uniform thickness from a powder, the apparatus including: a first nip roller and a second nip roller, each of the first nip roller and second nip roller being configured to compress the powder as it passes between the first nip roller and the second nip roller and thereby form the film, whereby in the absence of a force counteracting the pressure of the passage of the powder between the first nip roller and the second nip roller the first nip roller is deflected to a greater degree than the second nip roller; wherein the first nip roller and the second nip roller are each associated with one or more eccentric bearings that rotate to apply force vectors to the first nip roller and the second nip roller.

In some aspects, the techniques described herein relate to an apparatus, wherein the apparatus is configured so that a first contact area between the film and the first nip roller is smaller than a second contact area between the film and the second nip roller.

In some aspects, the techniques described herein relate to an apparatus, wherein the eccentric bearings are configured to apply a greater magnitude of force from the force vectors to the second nip roller than to the first nip roller.

In some aspects, the techniques described herein relate to an apparatus, wherein the eccentric bearings are configured to apply a different vector of force to each side of the same nip roller.

In some aspects, the techniques described herein relate to an apparatus, further including a position sensor configured to determine the position of at least one of the eccentric bearings.

In some aspects, the techniques described herein relate to an apparatus, wherein the first nip roller and the second nip roller are configured to each independently apply a force having a magnitude of about 1 kN to about 75 kN, where such force is attributable only to the action of the eccentric bearings and is separate from any additional force applied by other parts of the apparatus on the first nip roller and the second nip roller.

In some aspects, the techniques described herein relate to an apparatus, wherein the apparatus is capable of imparting a uniform thickness to the film such that the film has a thickness variation across its width of no more than about 10 µm.

In some aspects, the techniques described herein relate to a method of forming a film having a uniform thickness from a powder, the method including: compressing and passing the powder between a first nip roller and a second nip roller to thereby form a film, whereby in the absence of a force counteracting the pressure of the passage of the powder between the first nip roller and the second counteracting force the first nip roller is deflected to a greater degree than the second nip roller by passage of the film, and adjusting the deflection of the first nip roller, the second nip roller, or both by rotating one or more eccentric bearings that are associated with the first nip roller and the second nip roller to apply force vectors to the first nip roller and the second nip roller.

In some aspects, the techniques described herein relate to a method, wherein the eccentric bearings apply a greater magnitude of force from the force vectors to the second nip roller than to the first nip roller.

In some aspects, the techniques described herein relate to a method, wherein the eccentric bearings apply a different vector of force to each side of the same nip roller.

In some aspects, the techniques described herein relate to a method, further including determining with a position sensor the position of at least one of the eccentric bearings.

In some aspects, the techniques described herein relate to a method, wherein the magnitude of the force vectors that are applied by rotating the one or more eccentric bearings is about 1 kN to about 75 kN.

In some aspects, the techniques described herein relate to a method, wherein the film has a thickness variation across its width of no more than about 10 µm.

In some aspects, the techniques described herein relate to a film having a uniform thickness such that the film has a thickness variation across its width of no more than about 10 µm, the film being formed by compressing and passing a powder between a first nip roller and a second nip roller, the first nip roller and the second nip roller being adjusted by one or more eccentric bearings that are associated with the first nip roller and the second nip roller and apply force vectors to the first nip roller and the second nip roller.

In some aspects, the techniques described herein relate to a film, wherein the film is one or more of an anode film, a cathode film, a separator film, a current collector film, an interlayer film, an adhesive film, a primer film, or a laminate of one or more of the preceding films.

DRAWINGS

Aspects, features, benefits and advantages of the embodiments described herein will be apparent with regard to the following description, appended claims, and accompanying drawings where:

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

This disclosure describes an apparatus for retaining the alignment of integrated nip rollers to ensure the film produced by the nip rollers has uniform thickness. Through the independent rotation of at least two eccentric bearings attached to the nip rollers, a countering deflection can be created that eliminates any deflection in any angle orthogonal to the center axis of the rollers caused from various sources of pressure.

As described herein, "backup roller" or "calendering roller" means a roller which is not a nip roller and which is positioned on other parts of the apparatus. The one or more backup rollers can have a variety of designs and functional purposes. It is understood that depending on the path of a film that moves through the apparatus, a backup roller may be a calendering roller which applies one or more of heat, pressure, or other physical condition to the film. Alternatively, the backup roller can be an idler roller which serves to facilitate the transport or handling of the film.

For the purposes of this specification, the term "resting state" is used to refer to a roller that has no net deflection in both the horizontal and the vertical directions. For example, one embodiment of a resting state includes a nip roller that is in complete vertical and horizontal alignment with the backup rollers.

The Rollers

Figure 1:
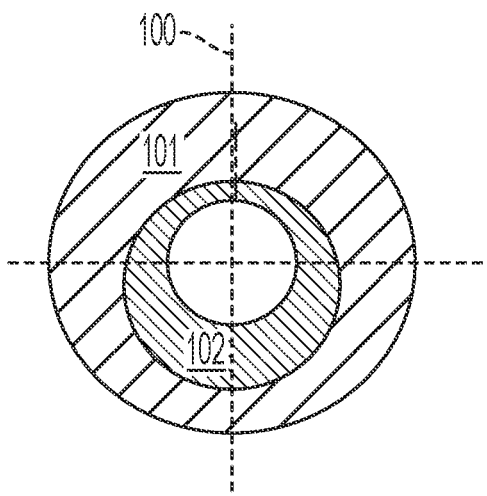
FIG. 1 illustrates the eccentric bearings used to retain alignment in any angle orthogonal to the center axis of the nip rollers in accordance with an embodiment.

FIG. 1 illustrates the eccentric bearings 100 used to retain alignment in any angle orthogonal to the center axis of the nip rollers in accordance with an embodiment. The bearings include a first, outer bearing 101 whose inner, hollow circle is eccentric with the part in whole. The bearings further include a second, inner bearing 102 whose inner, hollow circle is concentric with the part in whole when there is no deflection in the roller. The outer bearing is further configured to be able to rotate to apply a deflection to the roller capable of countering deflection caused by outside pressure. The inner bearing is also further configured to be able to rotate to apply a deflection to the roller capable of countering deflection caused by outside pressure, and is further configured to rotate so as to become eccentric with the part in whole.

Figure 2:
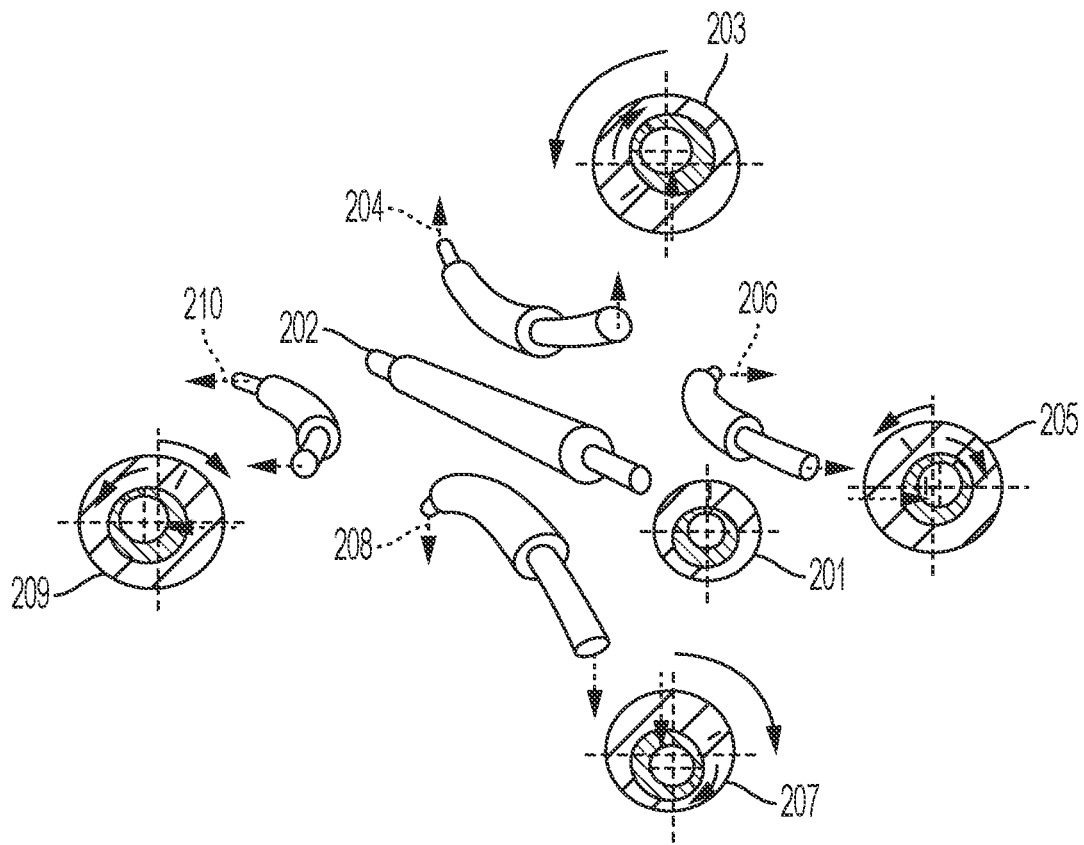
FIG. 2 illustrates the potential deflection caused by the rotation of the eccentric bearings in reference to the resting state in accordance with an embodiment.

FIG. 2 illustrates the potential deflection caused by the rotation of the eccentric bearings 201 in reference to the resting state of the nip roller 202 in accordance with an embodiment. This includes illustrating the rotation of the bearings 203 that results in a downward deflection of the roller 204, the rotation of the bearings 205 that results in a deflection in the negative x-direction of the roller 206, the rotation of the bearings 207 that results in an upward deflection of the roller 208, and the rotation of the bearings 209 that results in a deflection in the positive x-direction of the roller 210.

Figure 3:
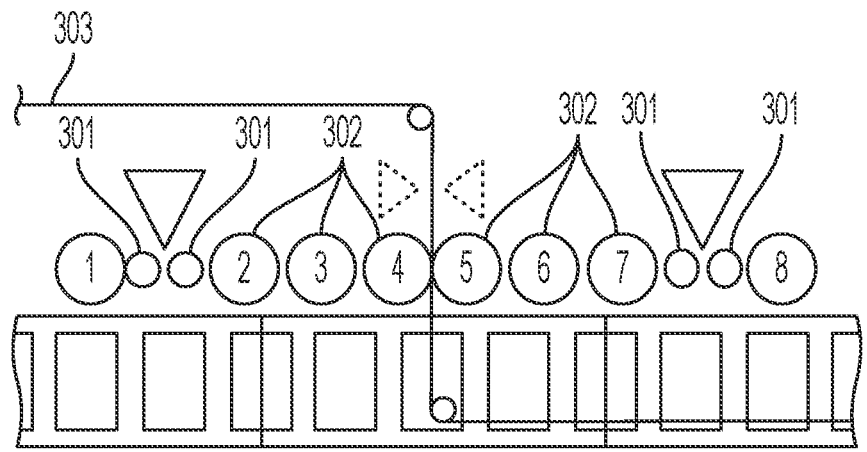
FIG. 3 is a diagram showing the location of the nip rollers in reference to the backup rollers in the integrated rolling system in accordance with an embodiment.

FIG. 3 is a diagram showing the location of the nip rollers 301 in reference to the backup rollers 302 in the integrated rolling system in accordance with an embodiment. This includes a sequence of at least one backup roller, two nip rollers, at least two backup rollers, two nip rollers, and at least one backup roller in alignment horizontally. This diagram further comprises a separator layer 303 positioned in the center of the sequence of rollers to allow for the films created by the nip rollers to be adhered to both sides of the separator layer.

Figure 4:
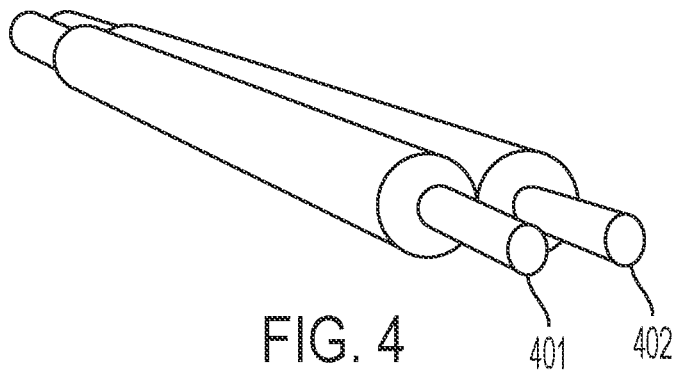
FIG. 4 illustrates the nip alignment of the nip rollers with no deflection in accordance with an embodiment.

FIG. 4 illustrates the nip alignment of the nip rollers with no deflection in accordance with an embodiment. This alignment includes one nip roller 401 positioned adjacent to a second nip roller 402 with the vertical center of the rollers lying on the same plane in the x-axis.

Figure 5A:
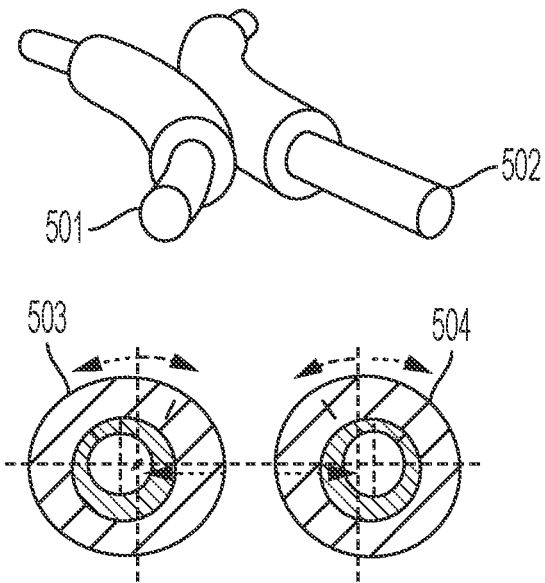
FIG. 5A illustrates the interaction of the eccentric bearings causing inward horizontal deflection in accordance with an embodiment.
Figure 5B:
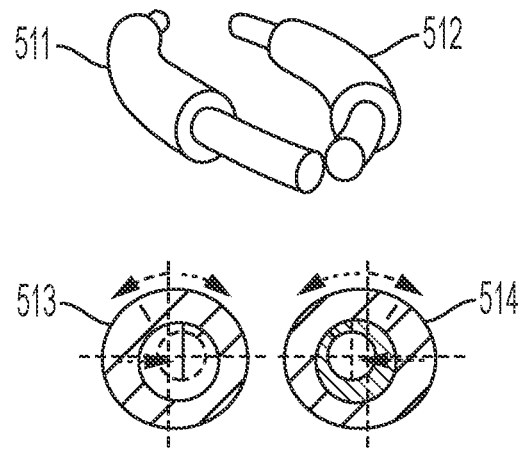
FIG. 5B illustrates the interaction of the eccentric bearings causing outward horizontal deflection in accordance with an embodiment.
Figure 5C:
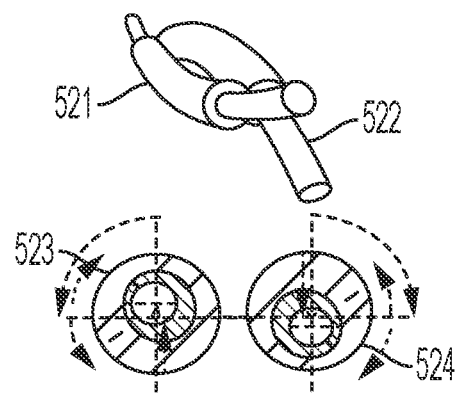
FIG. 5C illustrates the interaction of the eccentric bearings causing vertical deflection in accordance with an embodiment.
Figure 5D:
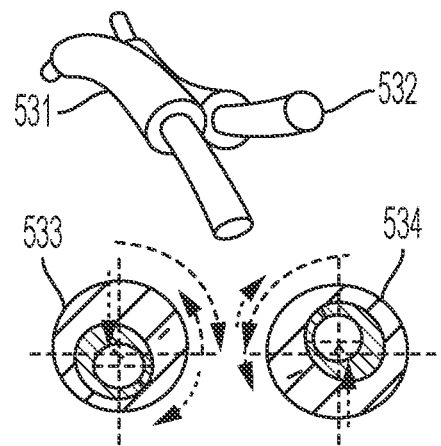
FIG. 5D illustrates the interaction of the eccentric bearings causing vertical deflection in accordance with an embodiment.

FIGS. 5A-5D illustrate the interaction of the bearings on the nip rollers in nip alignment. FIG. 5A refers to the one nip roller 501 in alignment with a second nip roller 502, where the bearings 503 on the first nip roller are aligned to create a deflection in the positive x-direction and the bearings 504 on the second nip roller are aligned to create a deflection in the negative x-direction. FIG. 5B refers to the one nip roller 511 in alignment with a second nip roller 512, where the bearings 513 on the first nip roller are aligned to create a deflection in the negative x-direction and the bearings 514 on the second nip roller are aligned to create a deflection in the positive x-direction. FIG. 5C refers to the one nip roller 521 in alignment with a second nip roller 522, where the bearings 523 on the first nip roller are aligned to create a downward deflection and the bearings 524 on the second nip roller are aligned to create an upward deflection. FIG. 5D refers to the one nip roller 531 in alignment with a second nip roller 532, where the bearings 533 on the first nip roller are aligned to create an upward deflection and the bearings 534 on the second nip roller are aligned to create a downward deflection.

Figure 6A:
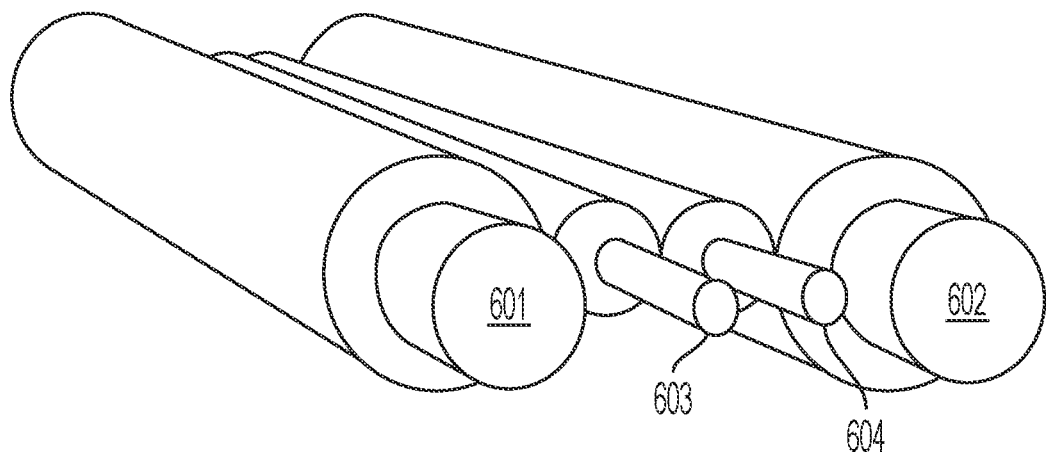
FIG. 6A is a diagram showing the nip rollers in alignment with the backup rollers in accordance with an embodiment.
Figure 6B:
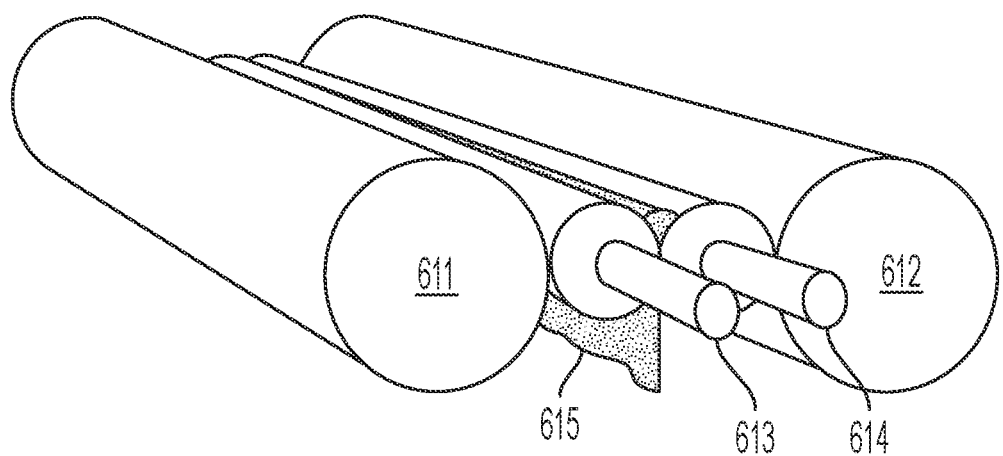
FIG. 6B is a diagram showing the nip rollers in alignment with the backup rollers with the powder feed creating a film in accordance with an embodiment.

FIGS. 6A-6B illustrate the alignment of the nip rollers with the backup rollers and the use of the rollers to create a film. This includes a sequence of adjacent rollers including a backup roller 601, a nip roller 603, a nip roller 604, and a backup roller 602 all in alignment. In one embodiment, a sequence of adjacent rollers is provided including a backup roller 611, a nip roller 615, a nip roller 614, and a nip roller 612 all in alignment, where a dry powder mixture in added between the nip rollers from above, and the rollers rotate so as to create a film 613 from the powder.

Figure 7A:
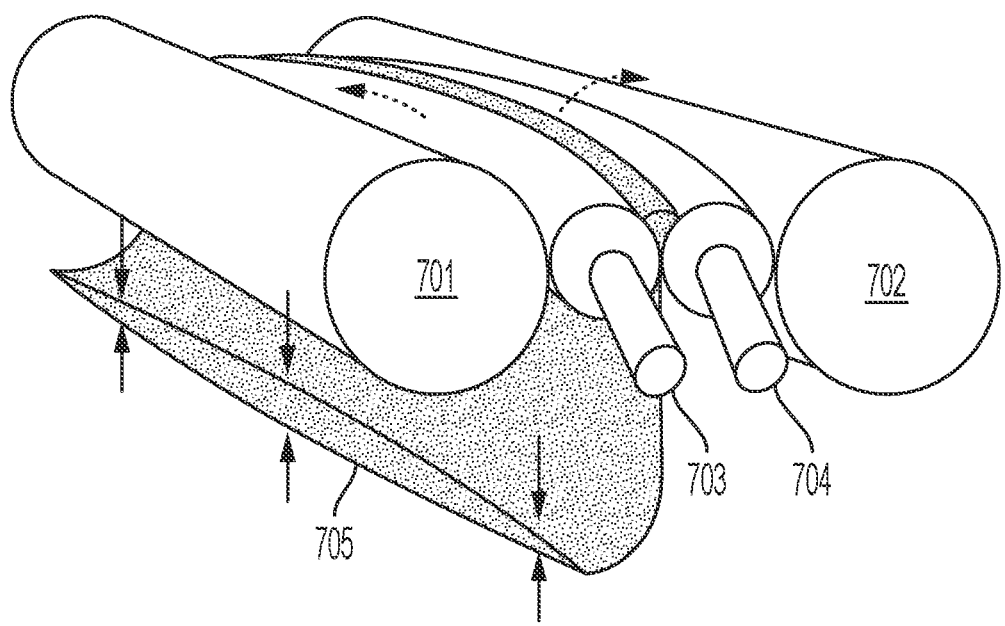
FIG. 7A illustrates the improper thickness tolerance created by deflection in the nip rollers in accordance with an embodiment.
Figure 7B:
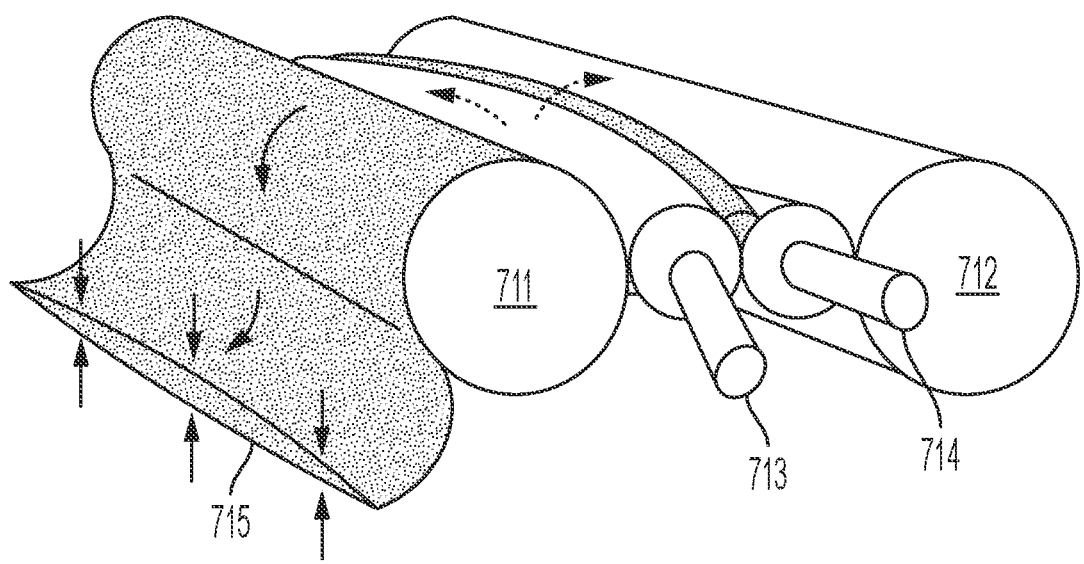
FIG. 7B illustrates the improper thickness tolerance created by deflection in a nip roller in accordance with an embodiment.

FIGS. 7A-7B illustrate the improper thickness tolerance created by deflection in the nip rollers in accordance with an embodiment. This includes a system in which there is a sequence of adjacent rollers including a backup roller 701, a nip roller 703, a nip roller 704, and a nip roller 702 all in alignment, where a dry powder mixture in added between the nip rollers from above and the two nip rollers are experiencing an upward deflection leading to the creation of a film 705 with an improper thickness tolerance. In one embodiment, a system is provided in which a sequence of adjacent rollers includes a backup roller 711, a nip roller 713, a nip roller 714, and a nip roller 712 all in alignment, where a dry powder mixture in added between the nip rollers from above and one of the two nip rollers is experiencing an upward deflection leading to the creation of a film 715 with an improper thickness tolerance.

Figure 8A:
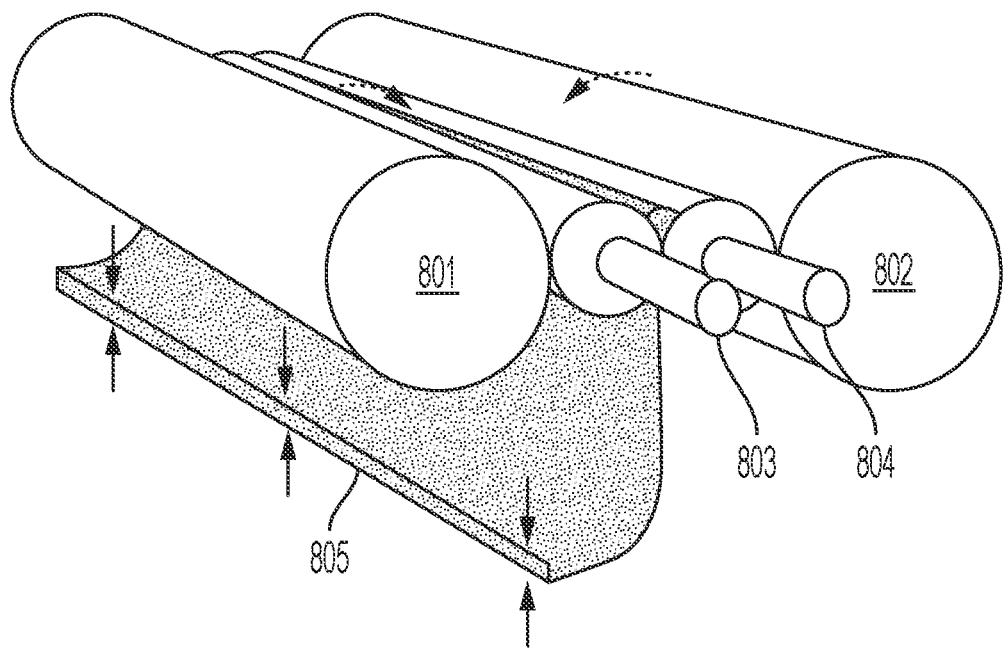
FIG. 8A illustrates the proper uniform film thickness created by properly aligned nip rollers in accordance with an embodiment.
Figure 8B:
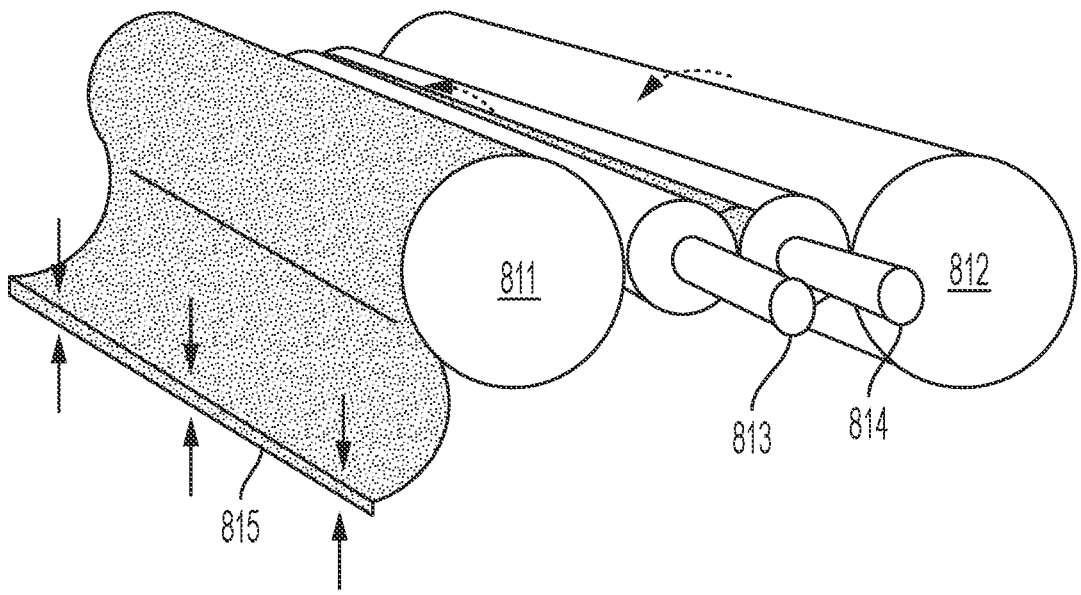
FIG. 8B illustrates the proper uniform film thickness created by properly aligned nip rollers in accordance with an embodiment.

FIGS. 8A-8B illustrate the proper uniform film thickness created by properly aligned nip rollers in accordance with an embodiment. This includes a system in which there is a sequence of adjacent rollers including a backup roller 801, a nip roller 803, a nip roller 804, and a nip roller 802 all in alignment, where a dry powder mixture in added between the nip rollers from above and the two nip rollers are properly aligned and are no experiencing a net deflection leading to the creation of a film 805 with a proper thickness tolerance. In one embodiment, a system is provided in which a sequence of adjacent rollers includes a backup roller 811, a nip roller 813, a nip roller 814, and a nip roller 812 all in alignment, where a dry powder mixture in added between the nip rollers from above, the two nip rollers are properly aligned, and the two nip rollers are not experiencing a net deflection leading to the creation of a film 815 with a proper thickness tolerance allowing the backup roller 811 to properly control the transport of the film.

During operation, the nip rollers are deflected in order to adjust the film that is formed as the dry powder mixture passes through the nip rollers. The amount of deflection is not limited, but is selected depending on various factors that will be apparent to skilled persons. In some embodiments, the amount of deflection is about 5 µm, about 10 µm, about 15 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm, all based on a roller having a diameter of about 200 mm. Alternatively, the amount of deflection can be expressed as a ratio that is selected based on the overall dimension of the nip roller. In one embodiment, the deflection ratio is about $2.5 \times 10^{-5}$ to about 0.0005, about $5 \times 10^{-5}$ to about 0.0005, or about $7.5 \times 10^{-5}$ to about 0.0005 based on the amount of displacement of the roller divided by the roller diameter. Although the above values are provided based on a nip roller that is 200 mm in diameter, the diameter of the roller is not so limited. It will be recognized that larger nip rollers may be able to achieve additional deflection.

The deflection of the nip roller is continuously adjustable in any direction. As shown in FIG. 2, by rotating one or more of the eccentric bearings 201, 203, 205, 207, and 209, the nip roller 202 is deflected in any direction. The bending is shown by reference characters 204, 206, 208, and 210. Again, it will be appreciated that the rotation of the eccentric bearings is not limited and that therefore the amount and direction of the roller deflection is also not limited.

In addition to the amount and direction of the roller deflection, the nip rollers can each be controlled individually by rotating only the eccentric bearings associated with each individual roller. This allows the user to further control the amount of space between the rollers and therefore the thickness of the film that passes between the rollers. The direction of the rotation is not limited and each of the eccentric bearings can be rotated separately by any amount. Still further, each individual eccentric bearing that is associated with a particular nip roller can be adjusted, which provides additional control over the deflection of each roller.

In some embodiments, the nip rollers have a crown which serves to further increase the accuracy and precision that the rollers impart on a film. The crown ensures that when the roller is deflected or otherwise manipulated, the contact footprint and thus the film profile and film thickness remain flat and accurate. The amount of the crown is not limited and is selected based on the requirements of a particular film and the deflection that is selected for each roller. In some embodiments, the nip roller has a crown of about 3 µm, about 4 µm, about 5 µm, about 6 µm, about 7 µm, about 8 µm, about 9 µm, about 10 µm, or any range of the above values, such as about 3 µm to about 10 µm, about 4 µm to about 9 µm, or about 4 µm to about 8 µm.

The film that is formed by the disclosed nip rollers is not limited and can be a metal, a polymer, a paper, a ceramic, or a mixture or laminate of one or more of the above. In certain embodiments the film that is formed is formed from a dry powder that is then formed as a part of a Li-ion cell. When the film is formed from a dry powder, it is formed into a cathode or an anode for the construction of Li-ion cells.

The nip rollers of the disclosure can achieve high levels of both accuracy and precision with respect to the film that is formed. In some embodiments, the crown is about 5 µm, about 10 µm, about 15 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm, or any range that is formed by two or more of the previous values as endpoints. The crown can be about 30 µm to about 50 µm.

In addition to adjusting the gap between the nip rollers to control the thickness of the film, the disclosed nip rollers and eccentric bearings can also be used to adjust the amount of pressure that is applied to a film. The magnitude of the force that is applied by the first nip roller or the second nip roller that is attributable to the adjustments made by the eccentric bearings alone without any external structures or devices can be up to about 75 kN, up to about 50 kN, up to about 25 kN, about 1 kN to about 75 kN, about 1 kN to about 50 kN, about 10 kN to about 50 kN, about 10 kN to about 40 kN, about 10 kN to about 30 kN, or any combination of one or more of the preceding ranges. In this way, the first nip roller and the second nip roller can each be independently adjusted and apply significant pressure to a powder or film. It is appreciated that the aforementioned pressure is only attributable to the adjustments made by the eccentric bearings, and that the first nip and the second nip can each apply additional force based on other structures in the apparatus.

Alternatively, the accuracy of the eccentric bearing and associated nip roller is measured by the uniformity of the film that is formed by the nip roller. In some embodiments, a cathode or anode film that is formed by the nip roller of the disclosure has a measured thickness that varies by no more than about 10 µm, no more than about 8 µm, no more than about 6 µm, no more than 4 µm, nor more than about 3 µm, no more than about 2 µm, no more than about 1 µm, about 1-10 µm, about 1-8 µm, about 1-6 µm, about 1-4 µm, about 1-3 µm, or about 1-2 µm. The above values are measured across the width of the film that is necessary for the form factor of cell that is being produced.

For each of the preceding paragraphs describing the crown of the nip roller, the amount of force applied to the nip rollers, and the accuracy of the eccentric bearing and associated nip rollers as measured by the uniformity of the film, these are again measured with respect to the width necessary for the form factor of the cells, such as Li-ion cells, that are to be produced by the apparatus. Examples of form factors are not limited and include cylindrical cells 10440 or 1044 (10 mm diameter by 44 mm length), 14500 or 1450 (14 mm diameter by 50 mm length), 16340 or 1634 or CR123A (16 mm diameter by 34 mm length), 18650 or 1865 (18 mm diameter by 65 mm length), 21700 or 2170 (21 mm diameter by 70 mm length), 26650 or 2665 (26 mm diameter by 65 mm length), 32650 or 3265 (32 mm diameter by 65 mm length), and 4680 (46 mm diameter by 80 mm length). Prismatic and pouch cells are also contemplated, with no limit to the contemplated dimension.

The disclosed apparatus further includes one or more position sensors associated with the eccentric bearings, the nip rollers, or both. The position sensors determine the amount of rotation of the eccentric bearings or the amount of rotation of the nip rollers and provide a digital or analog signal corresponding to that amount of rotation of the nip rollers or the eccentric bearings. Such position sensors are not limited and include potentiometric sensors, capacitive position sensors, or optical position sensors. The optical position sensors can operate by measuring with any light, including ultraviolet (UV), visible, or infrared light. In certain embodiments, the light that is selected for the optical position sensor is a laser of one of the foregoing bandwidths.

In still other embodiments or in conjunction with the provided position sensors, there can also be provided one or more film thickness sensors. The film thickness sensors are not limited and include optical sensors such as laser sensors. The film thickness sensors determine the thickness of the film that is formed by the nip rollers by measuring the film thickness on at least one point of the film. In some embodiments, there are one or more film thickness sensors that are configured to measure the thickness of several points across the width of the film. The thickness sensors provide a digital or analog signal corresponding to the thickness of film.

Uses

Use of the nip rollers and associated components of the disclosure is not limited, but certain uses are desirable. In some embodiments, production lines are constructed that include the nip rollers of the disclosure, along with various other components that are known to those of skill in the art. The nip rollers are incorporated to precisely control the thickness of films that are produced by the overall production line. Examples of the films that are configured to be formed or which use the nip rollers and associated components of the disclosure include one or more of an anode film, a cathode film, a separator film, a current collector film, an interlayer film, an adhesive film, a primer film, or laminates that comprises two or more films described above.

The disclosed nip rollers and associated components are disclosed as useful for forming films form a powder, but there are other uses as well. For example, it is contemplated that the nip rollers and associated components can form films from liquids or non-Newtonian fluids such as slurries.

Example

Figure 9A:
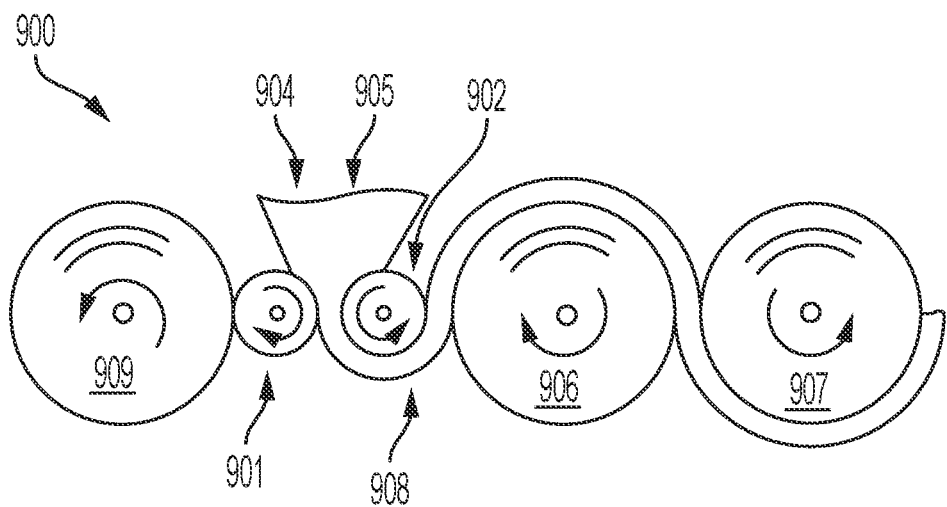
FIG. 9A illustrates the formation of a film in accordance with an embodiment.
Figure 9B:
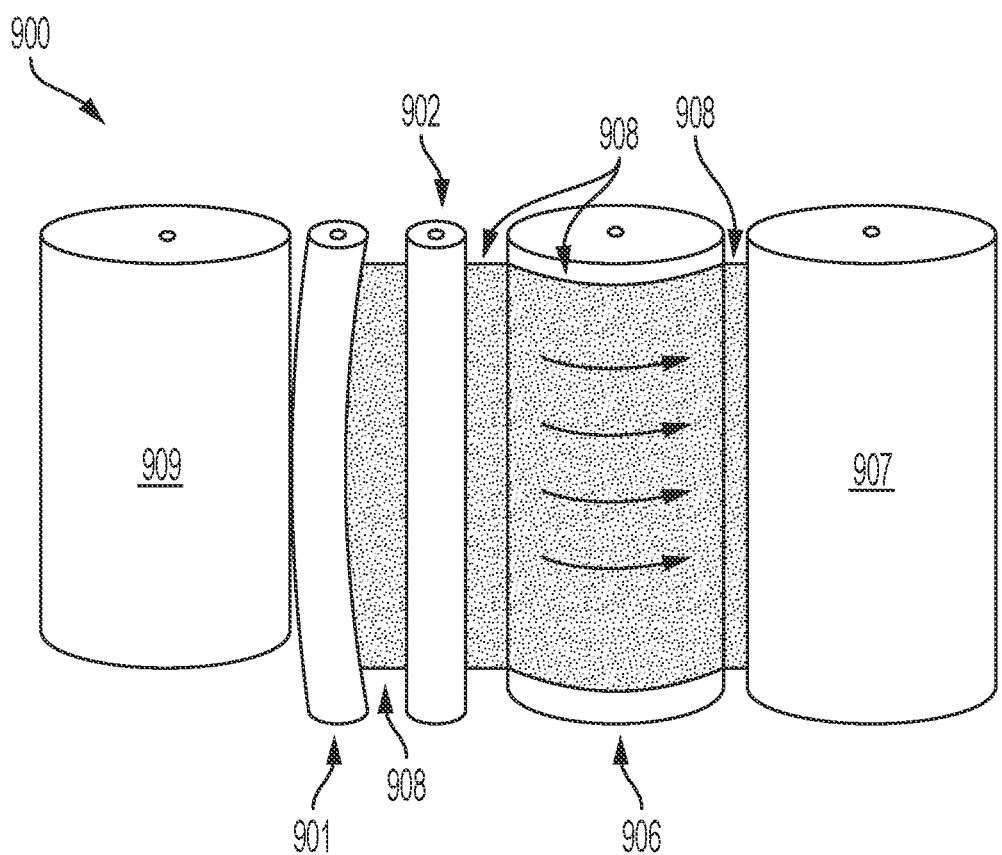
FIG. 9B illustrates another view of the formation of a film in accordance with an embodiment.

FIGS. 9A and 9B is a depiction of one particularly advantageous embodiment of the disclosure. According to FIGS. 9A and 9B, an apparatus 900 includes a first nip roller 901 and a second nip roller 902 that are positioned in close proximity to a powder mill hopper 904 in order to receive electrode material 905. There is further positioned a first calendering roller 906 and a second calendering roller 907 to one side of the first nip roller 901 and the second nip roller 902.

In use, the electrode material 905, which is typically a powder for a dry electrode, is compressed by the first nip roller 901 and the second nip roller 902, thereby forming a dry electrode film 908. After passing through and being formed by the pressure exerted by the first nip roller 901 and the second nip roller 902, the dry electrode film 908 winds around first calendering roller 906 and second calendering roller 907. As the dry electrode film 908 moves, it is compressed and exerts an equal and opposite force against the first nip roller 901 and second nip roller 902. However, the first nip roller 901 and second nip roller 902 are configured differently in response. The first nip roller 901 experiences substantial deflection, and must be adjusted accordingly by the eccentric bearings (not shown). However, the second nip roller 902 is surrounded by the dry electrode 908 and thus has pressure exerted on its other side. The second nip roller 902 therefore does not need adjustment to the same degree that is required by the first nip roller 901. Additionally, the second nip roller 902 is positioned proximate to, and is therefore supported to a degree by the calendering rollers 906 and 907 which have diameters that are larger than the diameter of the second nip roller 902.

Therefore, in the Example described herein and depicted in FIG. 9B, the first nip roller 901 and the second nip roller 902 is adjusted by one or more of the eccentric bearings (not shown) such that the magnitude of adjusting force exerted by the eccentric bearings on the first nip roller 901 is greater than the magnitude of adjusting force exerted by the eccentric bearings on the second nip roller 902. Accordingly, a uniform and precisely controlled gap between the first nip roller 901 and the second nip roller 902 is ensured while the dry electrode film 908 passes through.

It should be noted that although the first nip roller 901 is supported by support roller 909, the formed film 908 continues to exert a force on the roller, which leads to a greater displacement force being exerted on the first nip roller 901. This is shown by the exaggerated bend of first nip roller 901 in FIG. 9B, which must be corrected by the force that is exerted by the eccentric bearings on the first nip roller 901.

Figure 10:
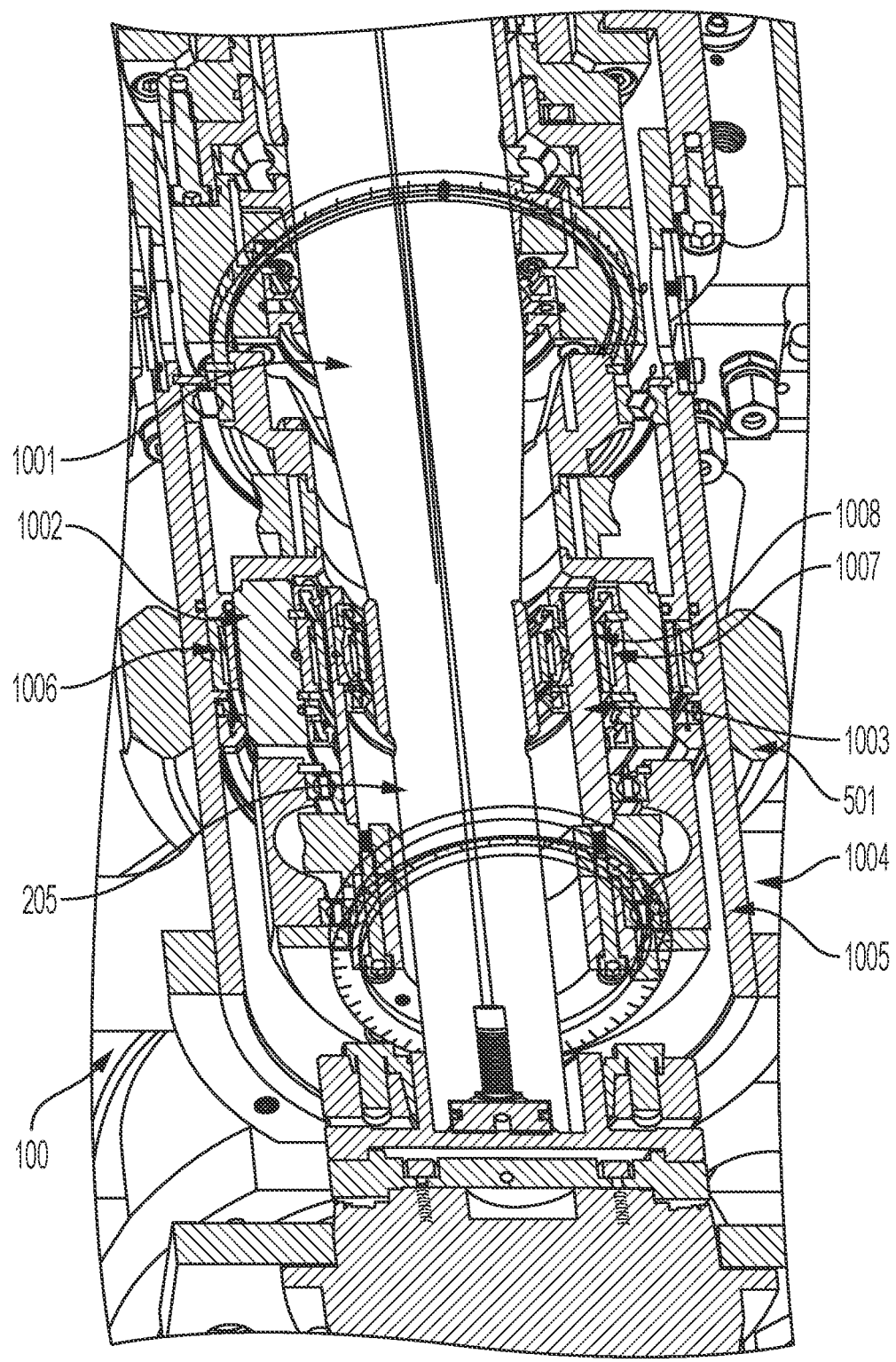
FIG. 10 illustrates a cross section of a nip roller with eccentric bearings in accordance with an embodiment.

FIG. 10 illustrates a cross section of a nip roller 1001, an outer eccentric bearing 1002, and an inner eccentric bearing 1003 mounted on the nip roller 1001. The nip roller 1001 is mounted in a machine frame 1004 which comprises a hollow shaft 1005 and a cylindrical bushing to house the nip roller 1001. The inter eccentric bearing 1003 and outer eccentric bearing 1002 are positioned so the inner eccentric bearing 1003 is positioned inside and partially overlapping the outer eccentric bearing 1002. The outer eccentric bearing 1002 is axially rotatably by a first radial bearing 1006. The inner eccentric bearing 1003 is axially rotatably by a second radial bearing 1007. The nip roller 1001 is axially totable by a third radial bearing 1008. In the diagram of FIG. 10, the outer eccentric bearing 1002 and the inner eccentric bearing 1003 are in a starting position, in which the nip roller 1001 is centered and not deflected. The outer eccentric bearing 1002 and inner eccentric bearing 1003 are independently adjustable.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially" of or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 cells refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An apparatus for forming a film having a uniform thickness from a powder, the apparatus comprising:
a first nip roller and a second nip roller, each of the first nip roller and second nip roller being configured to compress the powder as it passes between the first nip roller and the second nip roller and thereby form the film, whereby in the absence of a force counteracting the pressure of the passage of the powder between the first nip roller and the second nip roller the first nip roller is deflected to a greater degree than the second nip roller;
wherein the first nip roller and the second nip roller are each associated with one or more eccentric bearings that rotate to apply force vectors to the first nip roller and the second nip roller.

2. The apparatus of claim 1, wherein the apparatus is configured so that a first contact area between the film and the first nip roller is smaller than a second contact area between the film and the second nip roller.

3. The apparatus of claim 1, wherein the eccentric bearings are configured to apply a greater magnitude of force from the force vectors to the second nip roller than to the first nip roller.

4. The apparatus of claim 1, wherein the eccentric bearings are configured to apply a different vector of force to each side of the same nip roller.

5. The apparatus of claim 1, further comprising a position sensor configured to determine the position of at least one of the eccentric bearings.

6. The apparatus of claim 1, wherein the first nip roller and the second nip roller are configured to each independently apply a force having a magnitude of about 1 kN to about 75 kN, where such force is attributable only to the action of the eccentric bearings and is separate from any additional force applied by other parts of the apparatus on the first nip roller and the second nip roller.

7. The apparatus of claim 1, wherein the apparatus is capable of imparting a uniform thickness to the film such that the film has a thickness variation across its width of no more than about 10 μm.

8. A method of forming a film having a uniform thickness from a powder, the method comprising:
compressing and passing the powder between a first nip roller and a second nip roller to thereby form a film, whereby in the absence of a force counteracting the pressure of the passage of the powder between the first nip roller and the second counteracting force the first nip roller is deflected to a greater degree than the second nip roller by passage of the film, and
adjusting the deflection of the first nip roller, the second nip roller, or both by rotating one or more eccentric bearings that are associated with the first nip roller and the second nip roller to apply force vectors to the first nip roller and the second nip roller.

9. The method of claim 8, wherein the eccentric bearings apply a greater magnitude of force from the force vectors to the second nip roller than to the first nip roller.

10. The method of claim 8, wherein the eccentric bearings apply a different vector of force to each side of the same nip roller.

11. The method of claim 8, further comprising determining with a position sensor the position of at least one of the eccentric bearings.

12. The method of claim 8, wherein the magnitude of the force vectors that are applied by rotating the one or more eccentric bearings is about 1 kN to about 75 kN.

13. The method of claim 8, wherein the film has a thickness variation across its width of no more than about 10 μm.

* * * * *